Patented Apr. 6, 1954

2,674,604

UNITED STATES PATENT OFFICE 2,674,604

FLUORESCENT BRIGHTENERS

Milton Louis Hoefle and Robert Walter Wynn, Easton, Pa., assignors to General Aniline & Film Corporation, New York, N. Y., a corporation of Delaware No Drawing. Application November 15, 1951,
Serial No. 256,622

4 Claims. (Cl. 260—346.2)

This invention relates to novel fluorescent compounds of the following general formula

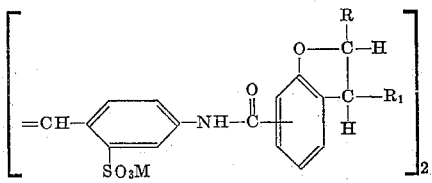

wherein R represents lower alkyl, preferably methyl, $R_1$ represents hydrogen or lower alkyl, preferably methyl and M represents hydrogen or a cation, usually alkali metal (sodium or potassium).

These compounds are readily prepared by condensing one molecular proportion of 4,4'-diamino-2,2'-stilbene disulfonic acid with an excess of about two molecular proportions of a dihydrobenzofurancarboxylic acid halide. Such dihydrobenzofurancarboxylic halides and their method of preparation are disclosed in our copending application, Serial No. 256,621.

These products are useful when incorporated into paper or other wrapping material to improve the whiteness as well as to protect the contents from the action of ultraviolet light. When applied to fabrics by methods well known in the art, the whiteness is remarkably improved. The white background of photographic prints and diazotype prints can be improved by incorporating some of the material into the coating formulations. By addition of the substances to discharge pastes, the whites obtained upon discharge are decidedly whiter than those discharges made in the absence of said materials. If small quantities of these materials are added to soaps or other detergents, fabrics which are washed using these formulations will be much whiter in the case of whites and much brighter in the case of colors than fabrics which are washed with ordinary soaps or detergents. These materials may be used to bleach fabrics. In such cases, the amount of bleach necessary is materially reduced and one or more steps in the bleaching operation may be eliminated.

The details of the present invention will be apparent from a consideration of the following specific examples in which the parts are by weight:

Example 1

Nine and three-tenths parts of 4,4'-diamino-2,2'-stilbenedisulfonic acid is dissolved in 50 parts of water by the addition of sufficient sodium hydroxide (as 40% aqueous solution). To this solution is added 16 parts of anhydrous sodium acetate and the resulting aqueous suspension is heated to 40° C. A solution of 14.7 parts of 2-methyl - 2,3 - dihydro - 7 - benzofurancarbonyl chloride in acetone is added dropwise. The mixture is heated to 55-60° C. until the reaction is complete, cooled and the product is isolated by filtration and dried.

The product corresponds to the formula:

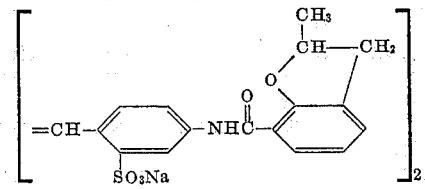

When this material is incorporated into discharge pastes and applied to fabrics, the whites thus obtained are remarkably whiter than those obtained using ordinary discharge pastes. When this material is applied to fibers of cellulose, wool or nylon, by methods well-known in the art, the white appearance of the fabric is thereby much improved.

Small amounts of this substance were added to soaps or detergents and the resulting mixtures are used to wash fabrics of cellulose, wool or nylon, the white materials thus washed are significantly whiter in appearance and colored materials are brighter than similar materials which are washed using ordinary soaps or detergents.

Example 2

Nine and three-tenths parts of 4,4'-diamino-2,2'-stilbenedisulfonic acid is dissolved in a mixture of 30 parts of water and 38 parts of a 20% aqueous sodium carbonate solution. Fifty-one parts of acetone is added and the resulting mixture cooled to 0-5° C. during the addition of 15.7 parts of 2-methyl-2,3-dihydro-5-benzofurancarbonyl chloride and the reaction mixture is maintained alkaline to Brilliant Yellow paper throughout by the addition of small amounts of a sodium carbonate solution. When the reaction is complete it is allowed to warm to room temperature and the precipitate is isolated by filtration and then oven dried.

This product corresponds to the formula:

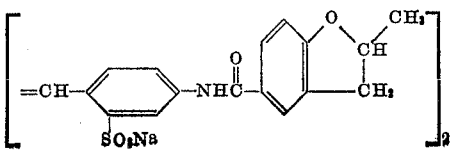

The brightener activity is essentially equivalent to the product described in Example 1.

*Example 3*

The procedure of Example 1 was repeated except that 15.0 parts of 2,3-dimethyl-2,3-dihydro-7-benzofurancarbonyl chloride was substituted for the 14.7 parts of 2-methyl-2,3-dihydro-7-benzofurancarbonyl chloride. There was thus obtained a product corresponding to the formula—

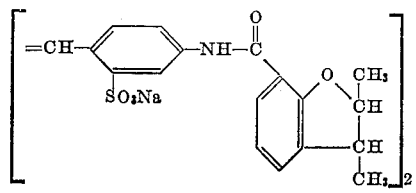

The brightener activity of this compound is essentially equivalent to the product described in Example 1.

It will be apparent that the novel fluorescent agents of the present invention, when produced in accordance with the foregoing examples, are obtained in the form of their sodium salts. However, the potassium salts have substantially similar properties and may be obtained by using potassium hydroxide and potassium acetate in place of sodium hydroxide and acetate, respectively, in Example 1 or by using potassium carbonate in place of sodium carbonate in Example 2 for the condensation of the diaminostilbene acid with the dihydrobenzofurancarboxylic acid halide.

These novel fluorescent agents may be obtained in the form of their free acids by acidification of the sodium or potassium salts while other salts such as ammonium or hydroxyalkylamine salts may be obtained by neutralization of the free acids. Where spirit soluble products are desired (in the brightening of lacquers, plastics, etc.) the higher alkyl or cycloalkyl amine salts of the free acids, such as the cyclohexylamine salts, may be produced by methods known in the art. The alkaline earth metal salts, such as barium or calcium salts, may be obtained from the free acids or by double decomposition of the sodium or potassium salts and have been found to be particularly useful for the brightening of photographic prints.

In common with other fluorescent agents obtained from 4,4'-diaminostilbene sulfonic and carboxylic acids, it has been found that the novel fluorescent amides of the present invention derived from 4,4'-diamino-2,2'-stilbene disulfonic acid, in general, fluoresce more strongly than those derived from other stilbene sulfonic and carboxylic acids. The amides derived from 4,4'-diamino-2,2'-stilbene disulfonic acid, therefore, represent the preferred embodiment of the present invention although corresponding amides derived from other diaminostilbene sulfonic or carboxylic acids are also fluorescent agents which, however, generally fluoresce somewhat more weakly.

As examples of such other 4,4'-diaminostilbene acids may be mentioned 4,4'-diamino-3,3'-stilbene disulfonic acid, 4,4'-diamino-2,2'-6,6'-stilbene tetrasulfonic acid, 4,4'-diamino-2,2'-stilbene dicarboxylic acid and 4,4'-diamino-3,3'-stilbene dicarboxylic acid.

We claim:

1. Fluorescent agents selected from the group consisting of compounds of the formula

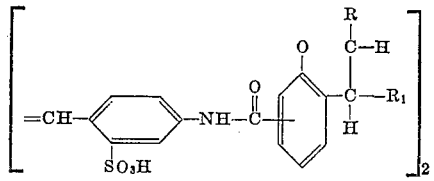

wherein R represents lower alkyl, $R_1$ represents a member of the group consisting of hydrogen and lower alkyl and the salts of said compound.

2. Fluorescent agents which in the form of the free acid have the formula

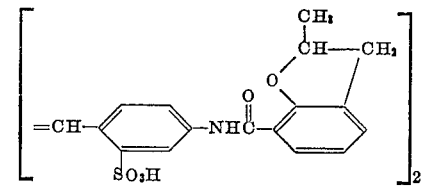

3. Fluorescent agents which in the form of the free acid have the formula

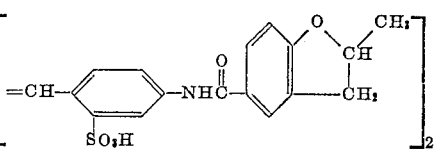

4. Fluorescent agents which in the form of the free acid have the formula

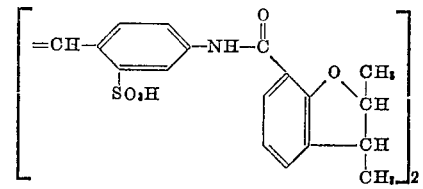

No references cited.